No. 652,103. Patented June 19, 1900.
H. L. GROUND, J. H. WEHMHOFF & G. N. BOBBIT.
HOG TRAP.
(Application filed Mar. 21, 1900.)
(No Model.)

Witnesses.
Nora Graham.
Ina Graham.

Inventors,
Harry L. Ground,
John H. Wehmhoff,
George N. Bobbit.
by their attorney L. P. Graham

UNITED STATES PATENT OFFICE.

HARRY L. GROUND, JOHN H. WEHMHOFF, AND GEORGE N. BOBBIT, OF DALTON CITY, ILLINOIS.

HOG-TRAP.

SPECIFICATION forming part of Letters Patent No. 652,103, dated June 19, 1900.

Application filed March 21, 1900. Serial No. 9,484. (No model.)

*To all whom it may concern:*

Be it known that we, HARRY L. GROUND, JOHN H. WEHMHOFF, and GEORGE N. BOBBIT, of Dalton City, in the county of Moultrie and State of Illinois, have invented certain new and useful Improvements in Hog-Traps, of which the following is a specification.

This invention relates to combined traps and surgical tables. It is exemplified in the structure hereinafter described, and it is defined in the appended claims.

Figure 1:
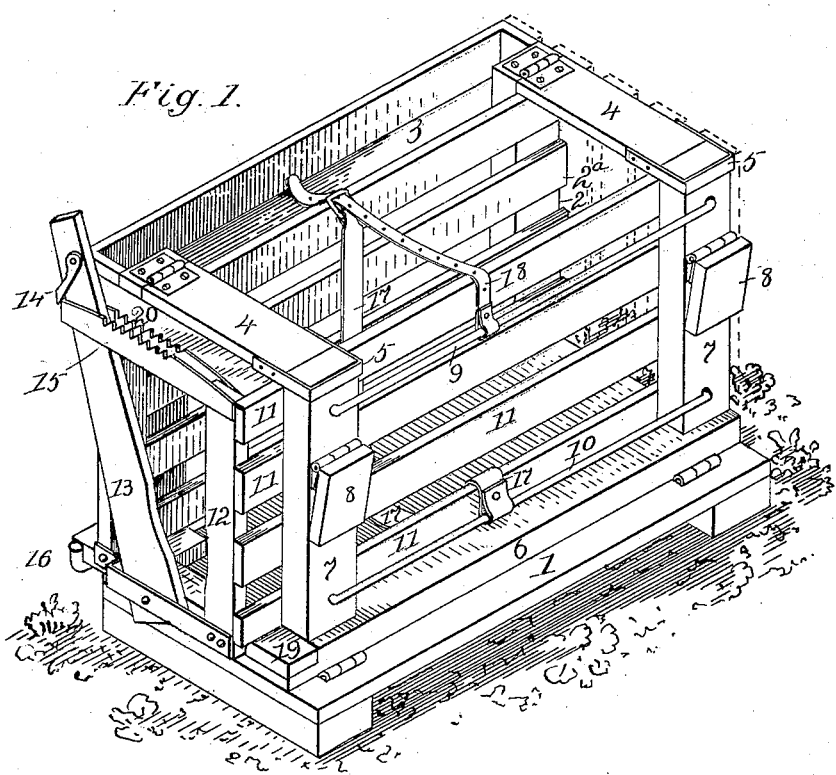
Figure 2:
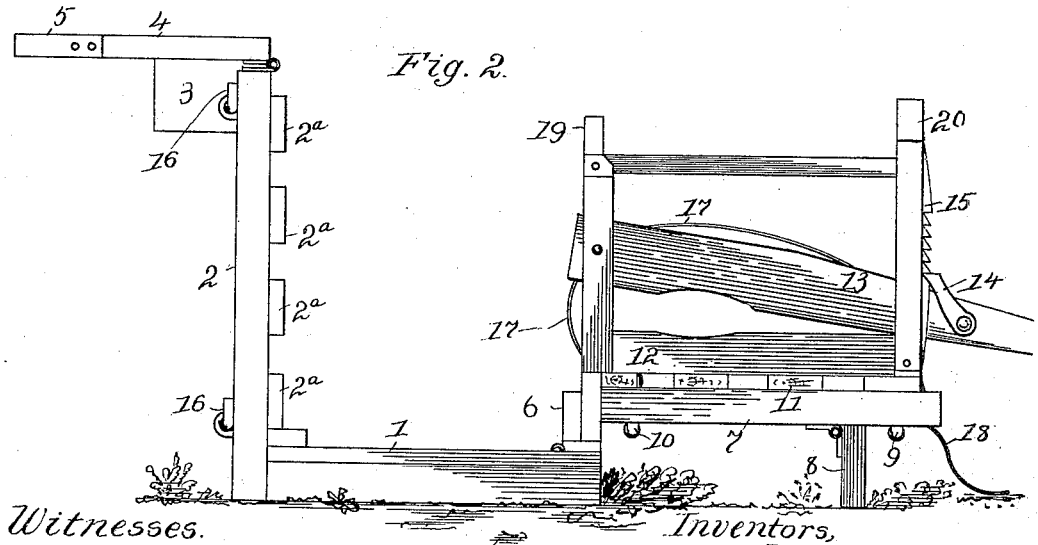

In the drawings forming part of this specification, Figure 1 is an isometrical perspective representation of an embodiment of our invention, showing the trap set; and Fig. 2 is an end elevation showing the device in position to be used as a castrating-table.

A permanent floor is shown at 1. At 2 are shown uprights rising from a side of the floor and fixed thereto, and at 2ª are shown boards attached to the fixed uprights to form a side of the trap. To the upper ends of uprights 2 are hinged cross-bars 4, and loops 5 are formed on the swinging ends of the cross-bars. A tool-box 3 is preferably formed on the stationary side of the trap adjacent to the hinges of the cross-bars, so as to form a support for the cross-bars when they are swung to the position shown in Fig. 2. A bar 6 is hinged to the floor on the side thereof opposite the permanent wall. Stiles 7 are fastened to the bar 6 in position for their upper ends to be caught by the loops 5 of cross-bars 4, and boards 11 are fastened to stiles 7 to form a swingable side of the trap and to also form the castrating-table. Legs 8 are hinged to stiles 7. They swing out of the way when the stiles are vertical, and they support the castrating-table when such table is in a horizontal position. Bars 19 and 20 are secured to one end of the castrating-table, and they extend pass the permanent wall and rest in hooks 16 when the swingable wall is in a vertical position. Cross-bar 20 is supplied with a ratchet-rack 15, and a swinging hog-holding bar 13 is pivotally connected with cross-bar 19. The hog-holding bar has a pawl 14, which engages the teeth of the ratchet-rack, and a fixed bar 12 is placed in position to coöperate with the swinging bar 13. A pair of rods 9 and 10 are fastened to stiles 7, one rod above the other, and a two-part strap, with buckle connection, is connected slidably with the rods. One part of the strap is shown at 17, and this part extends from the lower rod 10 across the bottom of the trap. The other part of the strap is shown at 18, and it extends from the upper rod 9 across the upper part of the trap and is buckled to part 17. The entrance to the trap may be supplied with a suitable door when desired.

The trap is set somewhat as shown in Fig. 1, with the bar 13 swung away from bar 12, the strap laid across the trap, and the cross-bars 4 holding the swingable wall in a vertical position. When a hog is driven into the trap, he walks partly over the lower run of the strap and sticks his head between bars 12 and 13. The bar 13 is then swung into the position shown in Fig. 2, catching the hog around the neck and securely holding him. The strap is slipped along the rods to the proper position and buckled tightly around the body of the hog. The cross-bars 4 are swung over onto the tool-box 3, and the castrating-table is lowered into a horizontal position and onto legs 8.

When it is desired to simply ring a hog, the operation is the same as in other traps.

We claim—

1. In a hog-trap the combination of a floor, a permanent side wall rising from one side of the floor, a swingable side wall hinged to the other side of the floor, a hog-holding clamp attached to an end of the swingable side wall and swingable bars on the permanent side wall to hold the swingable side wall vertical, substantially as described.

2. In a hog-trap, the combination of a floor, a permanent side wall rising from a side of the floor, a swingable side wall hinged to the other side of the floor, a hog-holding clamp attached to an end of the swingable side wall, swingable bars on the permanent wall to hold the swingable wall in a vertical position and a strap connected slidably at one end to the lower side of the swingable wall and connected slidably at the other end with the upper side of the swingable wall, substantially as described.

3. In a hog-trap, the combination of a floor, a permanent side wall rising from a side of the floor, a swingable side wall hinged to the other side of the floor, a hog-holding clamp attached to an end of the swingable side wall, swingable side bars on the permanent wall to hold the swingable wall in a vertical position, a pair of rods connected with the swingable side wall, and a two-part strap connected slidably with the rods of the swingable side wall and buckled together, substantially as described.

4. In a hog-trap, the combination of a floor, a permanent side wall rising from a side of the floor, a swingable side wall hinged to the other side of the floor, a hog-holding clamp attached to one end of the swingable wall, and legs hinged to the upper part of the swingable wall outside thereof, substantially as described.

In testimony whereof we sign our names in the presence of two subscribing witnesses.

HARRY L. GROUND.
JOHN H. WEHMHOFF.
GEORGE N. BOBBIT.

Witnesses:
C. A. HIGHT,
G. E. HIGHT.